United States Patent [19]
Regan et al.

[11] Patent Number: 5,651,211
[45] Date of Patent: Jul. 29, 1997

[54] WALL MOUNTED TRAP FOR FLIES AND INSECTS

[76] Inventors: Harold R. Regan, 4 Stires Lake; Kevin D. Sinclair, 2405 29th St., both of Columbus, Nebr. 68601

[21] Appl. No.: 439,848

[22] Filed: May 12, 1995

[51] Int. Cl.⁶ .................. A01M 1/04; A01M 1/16
[52] U.S. Cl. .................. 43/113; 43/114; 43/116
[58] Field of Search .................. 43/112, 116, 114, 43/113, 115, 117

[56] References Cited

U.S. PATENT DOCUMENTS

| | | | |
|---|---|---|---|
| 3,491,478 | 1/1970 | Gilbert | 43/112 |
| 3,816,959 | 6/1974 | Sekula | 43/114 |
| 4,052,811 | 10/1977 | Shuster et al. | 43/116 |
| 4,074,457 | 2/1978 | Sato et al. | 43/114 |
| 4,117,624 | 10/1978 | Phillips | 43/113 |
| 4,876,822 | 10/1989 | White | 43/113 |
| 5,365,690 | 11/1994 | Nelson et al. | 43/113 |

FOREIGN PATENT DOCUMENTS

WO92/20224  11/1992  WIPO.

*Primary Examiner*—Joseph J. Hail, III
*Assistant Examiner*—Jay A. Stelacone
*Attorney, Agent, or Firm*—John A. Beehner

[57] ABSTRACT

A wall mounted trap for flies and other flying insects includes an open topped cover shell concealing within a light source and a replaceable cartridge of trapping material. The light source is spaced substantially outwardly from the wall surface on which the trap is mounted and is situated adjacent the upper edge of the cover shell for radiating substantial light onto the wall surface directly above the trap. Likewise, a portion of the interior surface of the trap is of a shape and position relative to the light source for concentrating light from the source onto a wall surface immediately adjacent and above the trap. The replaceable cartridge includes a strip of trapping material arranged in a dispensing roll and adapted to be advanced therefrom to a take-up roller for presenting an upwardly facing exposed length of trapping material therebetween. The trapping material is housed within an open topped container for thorough collection of insects and sanitary handling of the used cartridges.

22 Claims, 8 Drawing Sheets

WALL MOUNTED TRAP FOR FLIES AND INSECTS

BACKGROUND OF THE INVENTION

1. Technical Field

This invention relates generally to a wall mounted trap for flies and insects and more particularly to such an apparatus including a replaceable cartridge of trapping material wherein the exposed surface of trapping material may be continuously or periodically replaced and wherein the cartridge may be installed, removed and disposed of without operator contact with the trapping material or insects trapped thereby. The trap includes a light source positioned above the cartridge and substantially spaced from the wall surface adjacent an energy concentrating surface for concentrating light from the light source onto the wall surface adjacent and above the trap.

2. Description of the Prior Art

Flying insects, such as flies a mosquitoes are a nuisance and present health and sanitation problems in many locations, such as restaurants, food preparation areas, food serving areas, residential facilities, rest homes and wherever flying insects present a problem. Various solutions have been proposed in the past to trap flies and insects, including such devices such as that disclosed in Phillips U.S. Pat. No. 4,117,624, which is table mounted and has an ultra violet light to attract insects onto a sticky reflecting surface. Sato et al., U.S. Pat. No. 4,074,457, White, U.S. Pat. No. 4,876, 822, Larkin, U.S. Pat. No. 4,949,501, and Nelson et al., U.S. Pat. No. 5,365,690, all disclose wall mounted units wherein a lamp radiates or reflects light onto a wall surface for attracting flies and insects to a sticky trapping material within the device. Smith, Patent Cooperation Treaty International Publication No. WO 92/20224 discloses another light based trap wherein a vertical panel of trapping material can be advanced across the front side of a vertical array of light tubes to provide for automatic replacement or renewal of the trapping material from time to time.

However, all of the above prior art have certain shortcomings which limit their effectiveness or render them impractical for use in sanitary environments such as food preparation areas. First, those devices which reflect light from a source onto a wall surface above the trap provide for direct or defused reflection of the light onto a large area of the wall thereby increasing the power requirements for the light source to provide sufficient intensity over a large portion of the wall surface to attract flies and insects. Likewise, the light source is generally positioned adjacent the wall surface on which the trap is mounted, whereby little light is radiated directly onto the wall surface adjacent and above the trap.

Another major problem with known traps of the prior art relates to sanitation, namely, operator contact with the trapping material and trapped insects when removing and replacing the same and the problem with insects and insect parts falling from the trapping material during replacement or removal of the spent trapping material from a trap.

Accordingly, a preliminary object of the present invention is to provide an improved wall mounted trap for flies and insects.

Another object is to provide such a trap which utilizes a light source as an attractant and which is energy efficient.

Another object is to provide such a trap capable of concentrating light from the light source onto the wall surface above the trap.

Another object is to provide such a trap wherein the light source is substantially spaced from the wall surface on which the trap is mounted for effective direct radiation of light onto the wall surface adjacent the trap.

Another object is to provide such a trap with a replaceable cartridge of trapping material wherein only a portion of the trapping materials exposed at a time and wherein the exposed portion is advanced across the cartridge to replace the exposed portion either continuously or from time to time.

Another object is to provide such a trap with a cartridge of trapping material capable continuous effective fly control over an extended period of time without operator intervention.

Another object is to provide such a trap having a replaceable cartridge which surrounds the trapping material for collecting any insects or parts of insects that fall from the trapping material.

Another object is to provide such a trap with a replaceable cartridge that can be easily handled with one hand without contacting the trapping material or trapped insects.

Another object is to provide such a trap having a replaceable cartridge of trapping material wherein the drive system for advancing trapping material in the cartridge is automatically engaged upon installation of the cartridge without any separate efforts or actions of the installer.

Another object is to provide such a trap which is simple and rugged in construction, economical to manufacture and use and efficient in operation.

SUMMARY OF THE INVENTION

The wall mounted flying insect trap of the present invention includes a base adapted to be mounted on a wall surface, a replaceable cartridge removably received and supported on the base and including an elongated strip of trapping material. A light source is mounted on the base at a position to be spaced substantially outwardly from a wall surface on which the base is mounted to maximize direct radiation of light onto the wall surface adjacent and above the trap. An open topped cover shell is mounted on the base at a position to substantially conceal the base, trapping material and light source on three sides so that those elements are not viewable from a position below the top edge of the cover shell.

The replaceable cartridge is preferably an open topped container having a take-up roller extended between opposite side walls. The elongated strip of trapping material is arranged in a dispensing roll spaced from the take-up roller and having one end secured to the take-up roller with the exposed portion of the strip between the dispensing roll and take-up roller having an upwardly facing top surface in the installed position of the cartridge. The upwardly facing posture gives broad exposure of the trapping material to the flies and insects attracted by the light source to the wall above the trap.

To advance the strip of trapping material across the cartridge, a driven gear is fixed on the take-up roller and a smaller drive gear is supported on the base and positioned for driving engagement with the driven gear in the fully installed position of the cartridge. The driven gear is arranged on the cartridge at a position to be moved into driven engagement with the drive gear upon movement of the cartridge to its fully installed position in the trap.

The cartridge preferably includes a bottom wall which cooperates with the side walls to define a receptacle for collecting insects or parts of insects which may fall from the trapping material for maintaining the trap as clean as possible and for sanitary handling of the spent cartridge. The base preferably provides a support surface on which the cartridge is slidably moved in a direction tangential to the drive gear for moving the driven gear into operated engagement with the stationary drive gear. The cover shell may have an opening which is adapted to be substantially closed by the cartridge in its fully installed position.

The base or cover shell has an interior surface of a shape and position relative to the light source for concentrating light from the source onto the wall surface at a position adjacent and above the trap. The interior surface may have a parabolic shape for concentrating the light as described. Likewise, a reflective material or sheet may be applied to that shaped interior surface for optimal reflection therefrom. The light source and shaped interior surface are preferably situated adjacent the upper edge of the cover shell with the light source being closer to the cover shell than to the wall surface on which the trap is mounted. The generally parabolic or other shaped interior surface preferably extends horizontally side to side across the base at a position below and outwardly of the light source.

DESCRIPTION OF THE PREFERRED EMBODIMENT

The wall mounted flying insect trap of the present invention is described in connection with a first embodiment 10 illustrated in FIGS. 1 through 7 and a second embodiment 110 illustrated in FIGS. 8 through 11.

Figure 1:
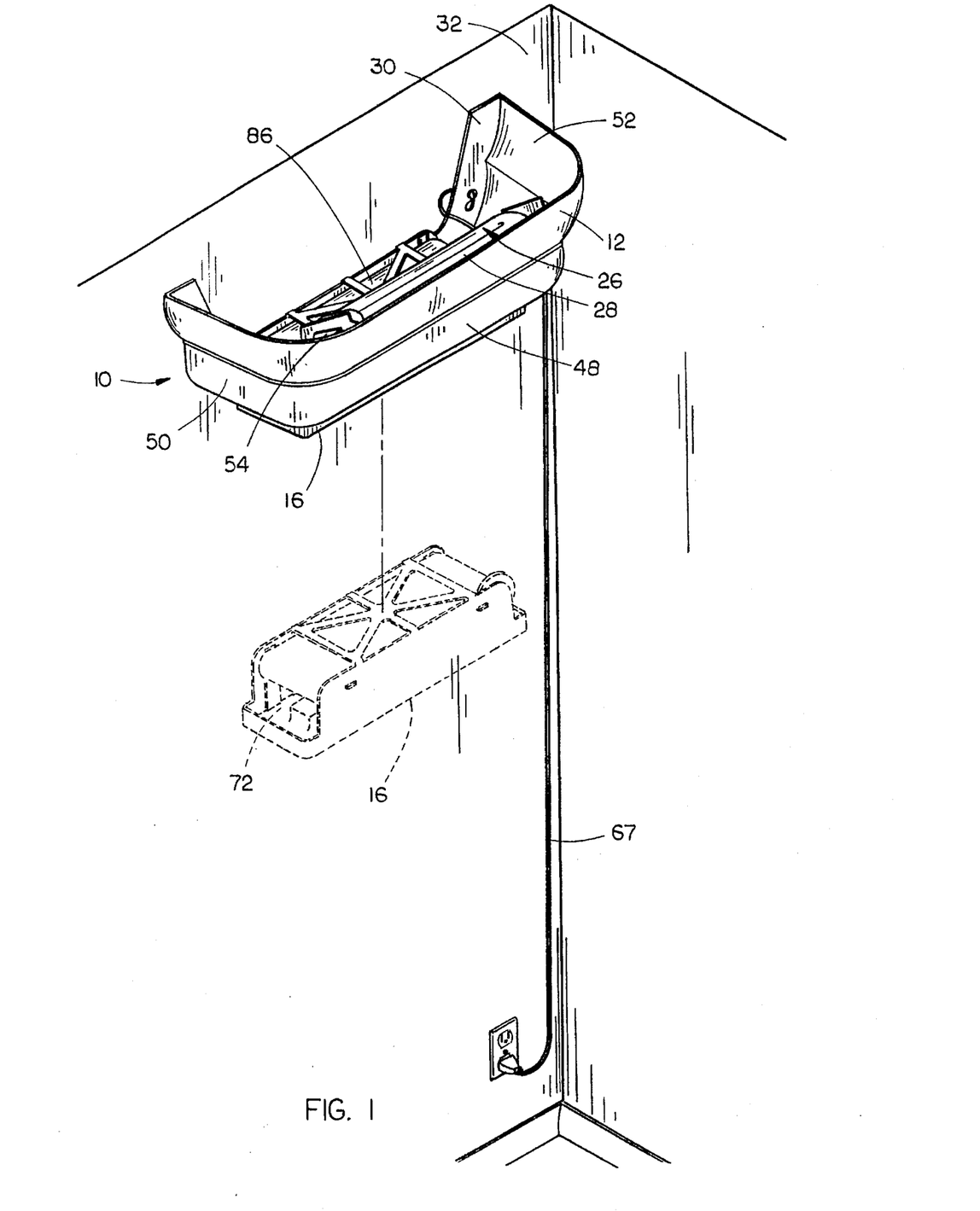
FIG. 1 is a perspective view of an alternate embodiment of the invention mounted on a wall surface with the trapping material cartridge additionally shown in a dotted line removed position.
Figure 2:
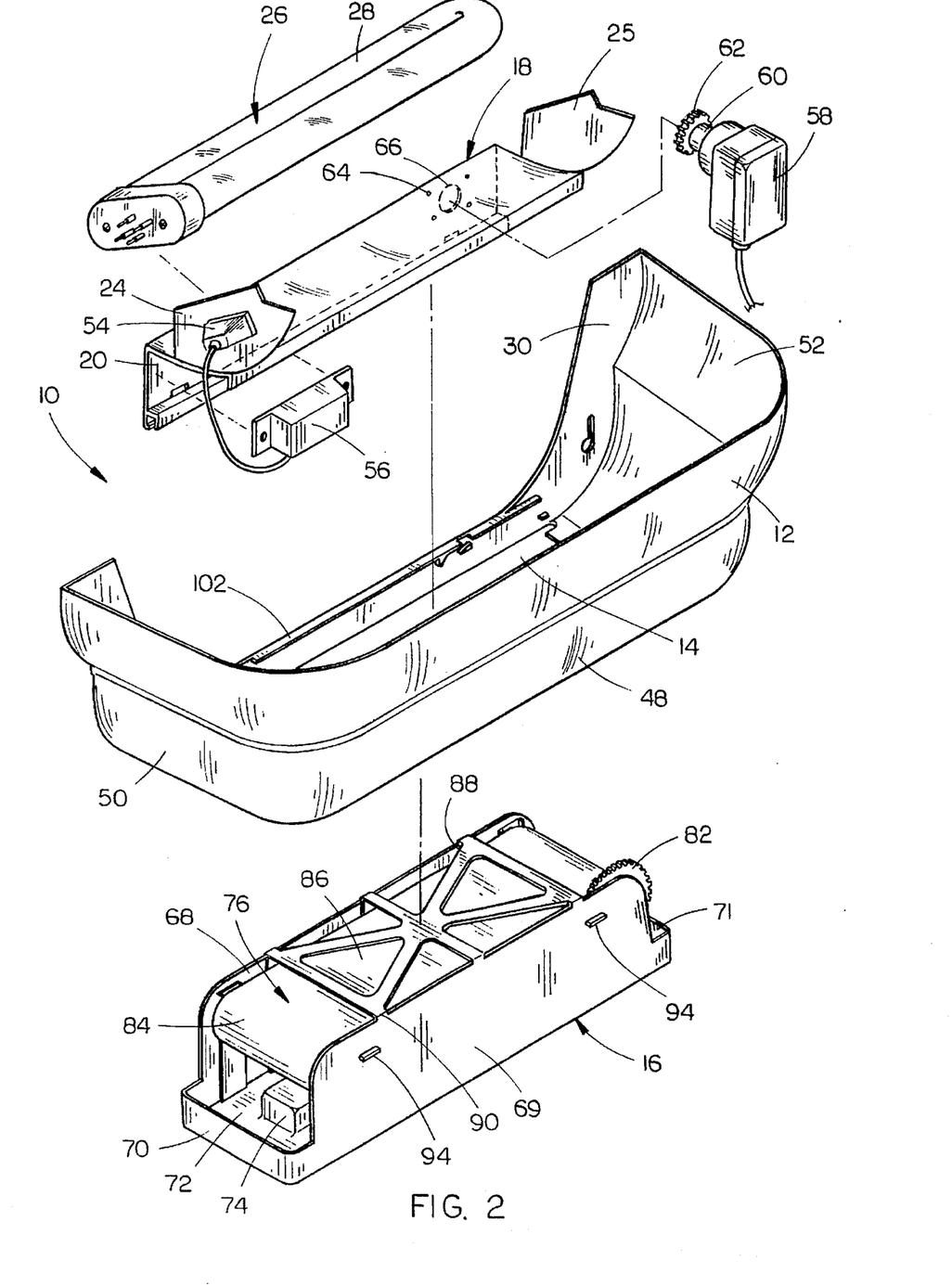
FIG. 2 is an exploded perspective view of the second embodiment of the invention.

Trap 10 is shown in FIGS. 1 and 2 as including an open topped cover shell 12 having a bottom opening 14 through which a trapping material cartridge 16 is installed and removed. Also mounted within cover shell 12 is an electrical elements support panel 18 which includes an upright cartridge support wall 20 and an arcuate wall 22 extended outwardly therefrom and supporting upright flanges 24 and 25 for mounting a light source 26 which is illustrated as a U-shaped ultra violet fluorescent tube 28. In this embodiment, the base comprises rear wall 30 and the electrical elements support panel 18. Rear wall 30 is integrally molded with cover shell 12 to provide a flat mounting surface for mounting the trap on a wall surface 32. Rear wall 30 is shaped as a relatively narrow peripheral flange along the interior edge of cover shell 12, both for material savings and to expose the wall surface against which light is directed for attracting flies and other insects.

Figure 6:
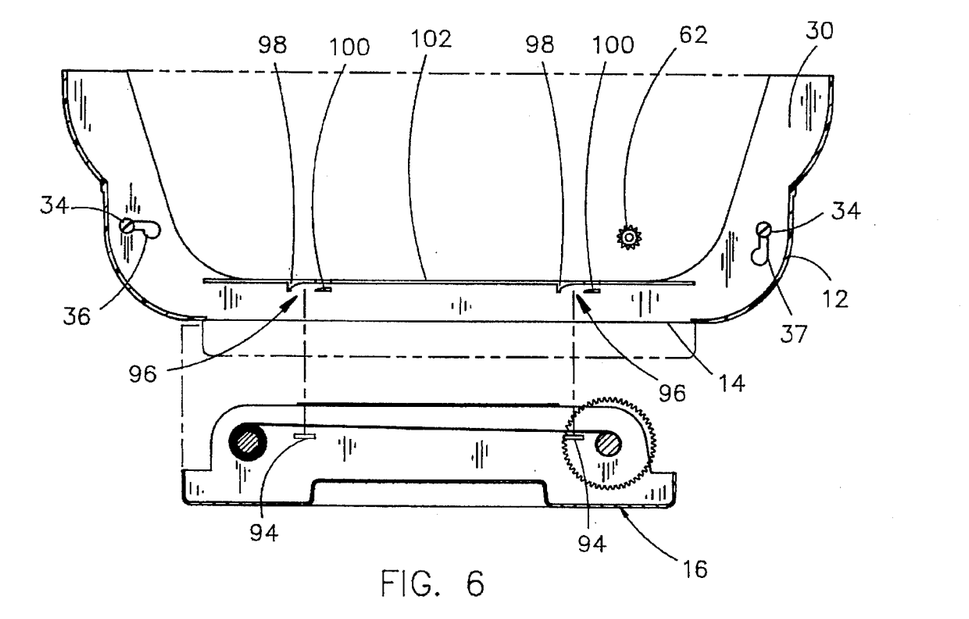
FIG. 6 is a diagrammatic front sectional view showing the bayonet slide lock system for installing the cartridge.
Figure 7:
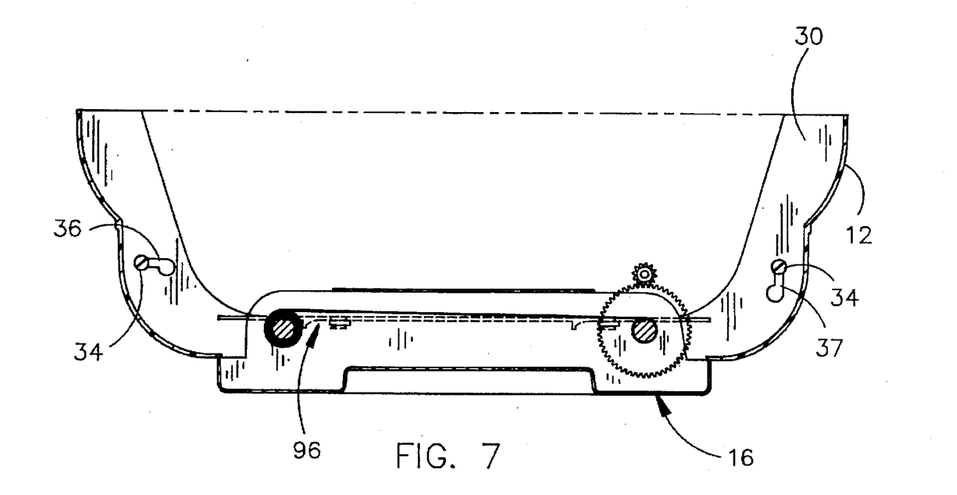
FIG. 7 is a diagrammatic front sectional view of the second embodiment of the trap showing the cartridge fully supported by the bayonet slide lock system and the cartridge drive gears engaged.

A preferred way of mounting the trap 10 on a wall surface is to provide a pair of headed fasteners such as screws 34 in FIG. 6 and to screw them into the wall surface 32 at positions horizontally spaced apart by the distance between the small ends of a pair of generally P-shaped slots 36 and 37 in rear wall 30, each of which has a wide end and a narrow end as illustrated in FIGS. 6 and 7. The P-shaped slots 36 and 37 are arranged perpendicular to one another for positively positioning the trap on the wall. The large end of horizontal slot 36 is placed over the head of the left screw 34 whereupon the trap is moved to the right to align the large end of vertical slot 37 with the head of the right hand screw 34. When the right screw head is received through the large end of vertical slot 37, the trap shifts slightly to the left and downwardly so that the shaft of the right screw 36 is seated at the top end of vertical slot 37. The trap is thus positively seated on the screws to prevent both downward and sideward movement of the trap, even without tightening the screws.

Figure 3:
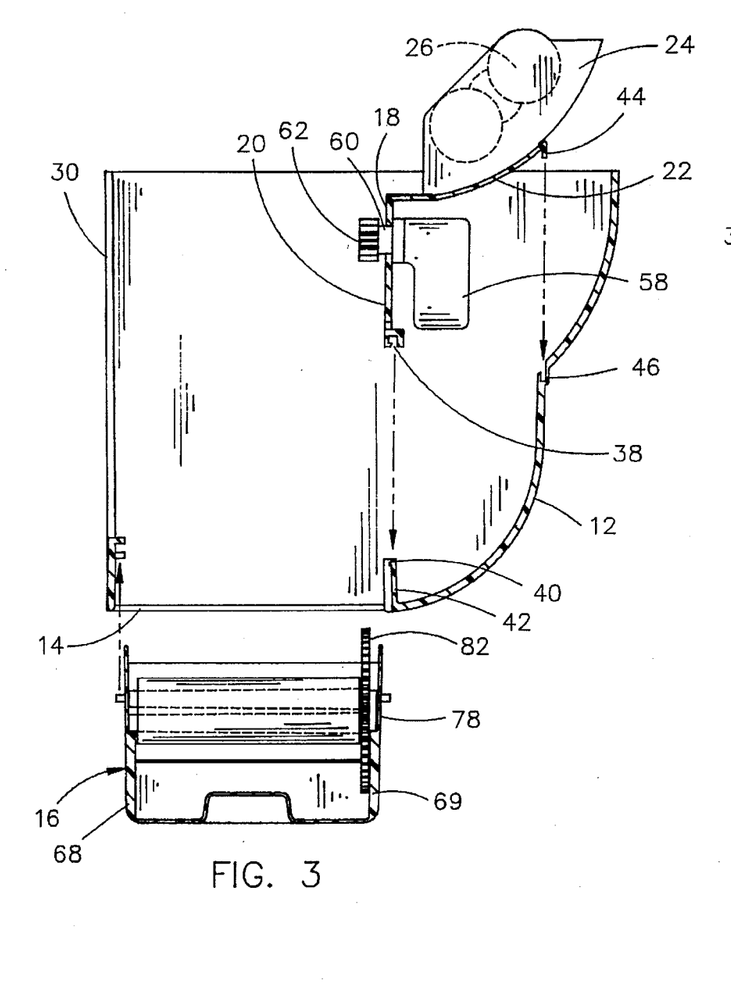
FIG. 3 is a side sectional exploded view of the second embodiment of the trap.

Referring to FIG. 3, the base is completed by lowering the electrical elements support panel 18 into place on the cover shell 12. Cartridge support wall 20 has a socket 38 formed in the underside thereof for a snap-fit connection onto a slightly enlarged top rail 40 of the wall 42 along the exterior edge of the cover shell's bottom opening 14. At the same time, a depending flange 44 on the outermost edge of arcuate wall 22 seats within a groove 46 in shell front wall 48. The opposite end walls 50 and 52 of cover shell 12 are shaped similarly to front wall 48 for aesthetic purposes as well as to afford an expanded opening for entry of flies and insects.

Figure 4:
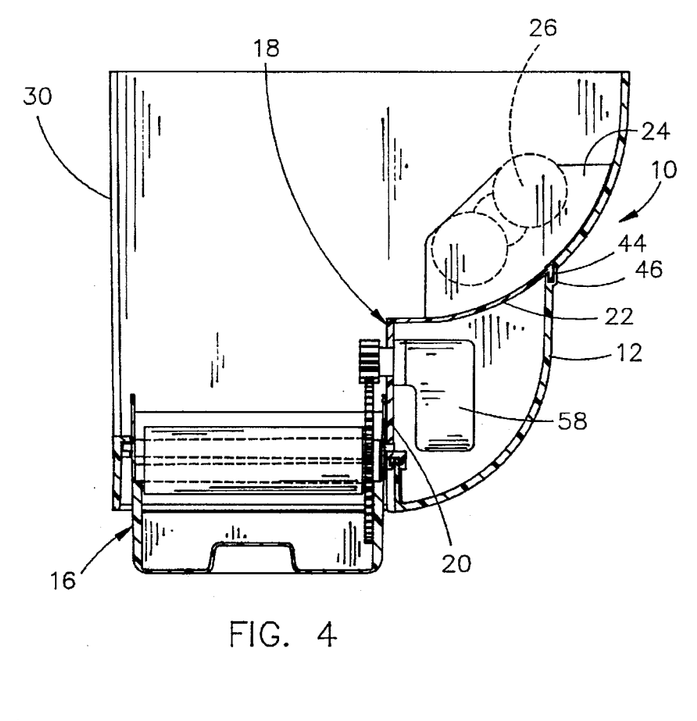
FIG. 4 is a side sectional view of the trap with the cartridge fully installed.

Referring to FIGS. 2 and 4, a receptacle 54 for fluorescent light tube 26 is mounted within an opening through upstanding flange 24 above arcuate wall 22. Fluorescent light 26 is plugged into receptacle 54 and extends horizontally outwardly therefrom to the opposite flange 25 which may be provided with a bracket for supporting the free end of the fluorescent tube 26. The ballast 56 or starter for fluorescent tube receptacle 54 may be mounted in the free space below arcuate wall 22 against the exterior surface of cartridge support wall 20 as shown in FIG. 2. A transformer may also be mounted under arcuate wall 22 against cartridge support wall 20 to accommodate connection to electrical power sources of the type found overseas.

Also mounted on cartridge support wall 20 is a motor 58 having an output shaft 60 on which a drive gear 62 is mounted. The motor is mounted to support wall 20 by screws inserted through a pattern of holes 64 surrounding hole 66 through which the motor output shaft extends for engaging the cartridge as described below.

Figure 8:
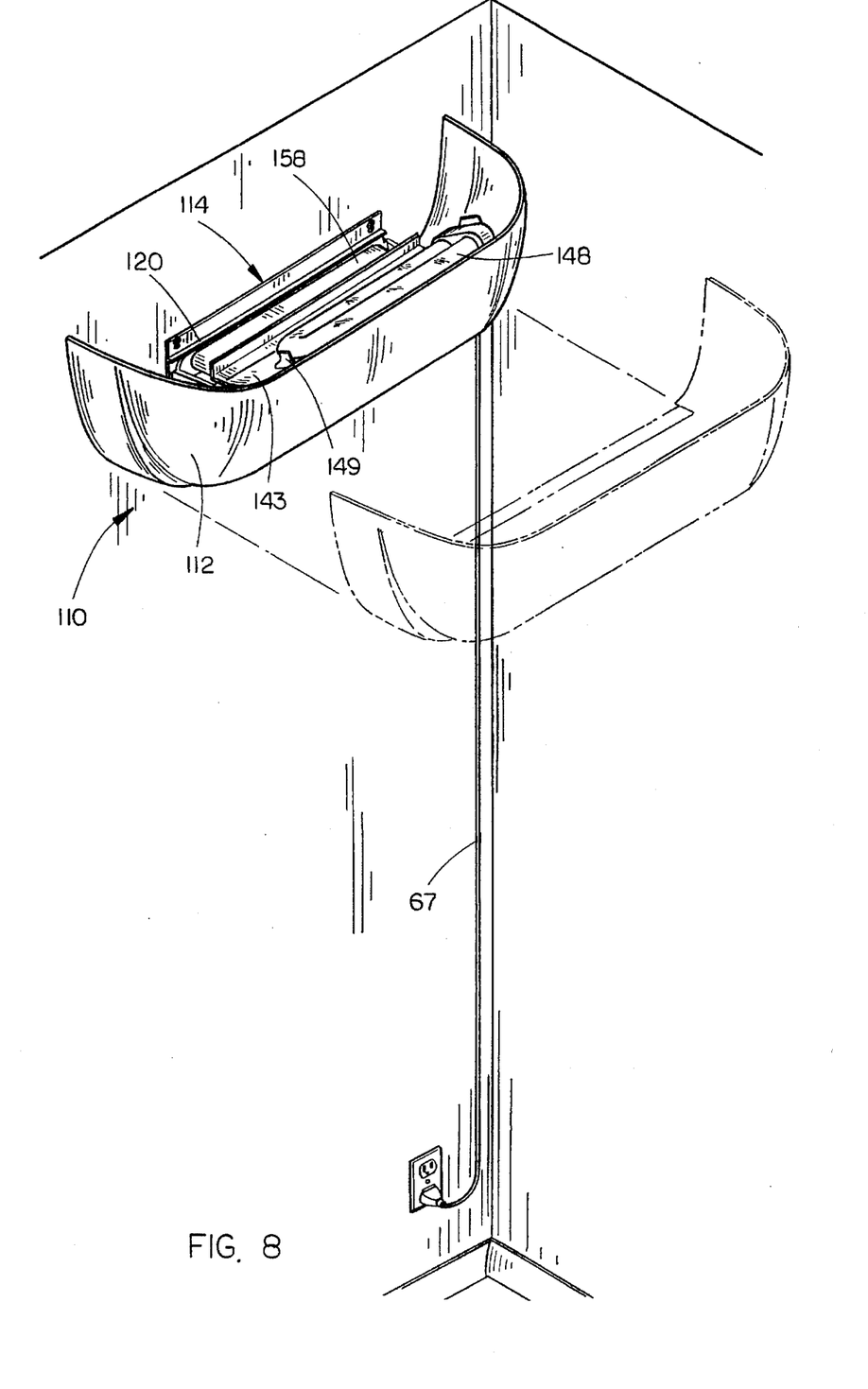
FIG. 8 is a perspective view of a first embodiment of the trap mounted on a wall surface with the cover shell additionally shown in a removed dotted line position.
Figure 9:
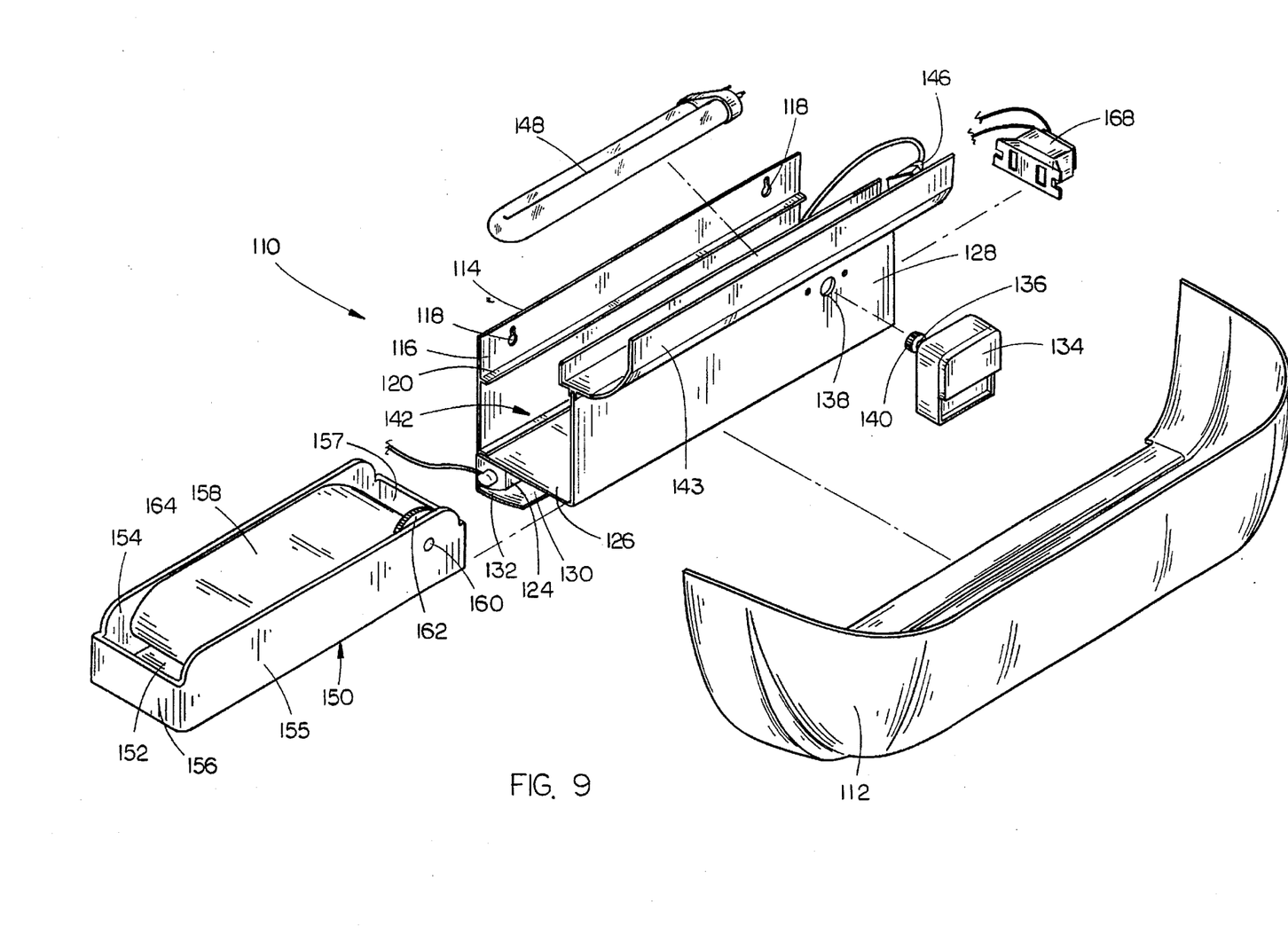
FIG. 9 is an exploded perspective view of the first embodiment of the trap.
Figure 10:
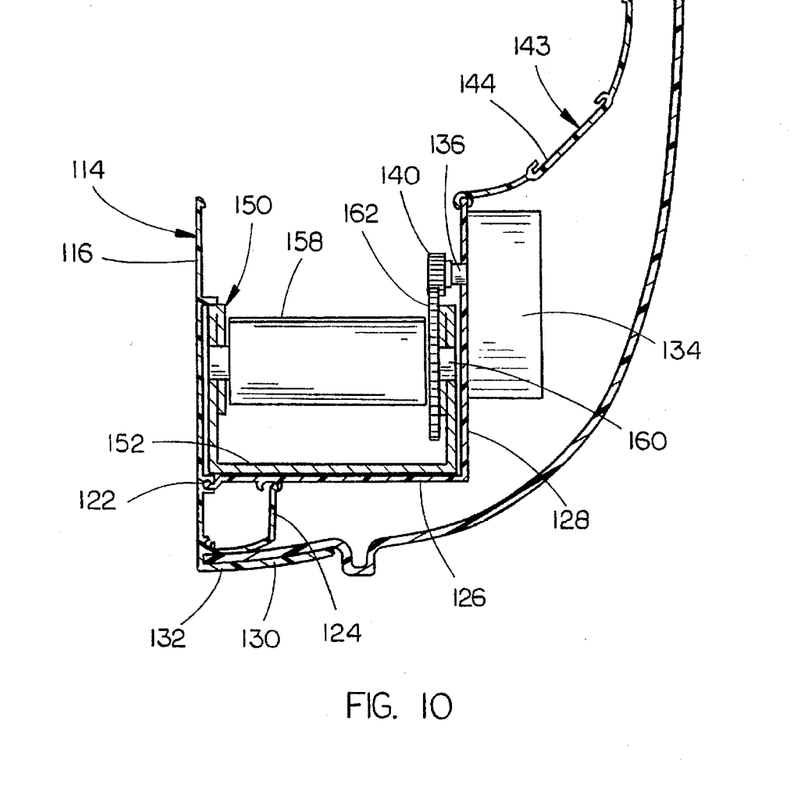
FIG. 10 is a side sectional view of the first embodiment of the trap.
Figure 11:
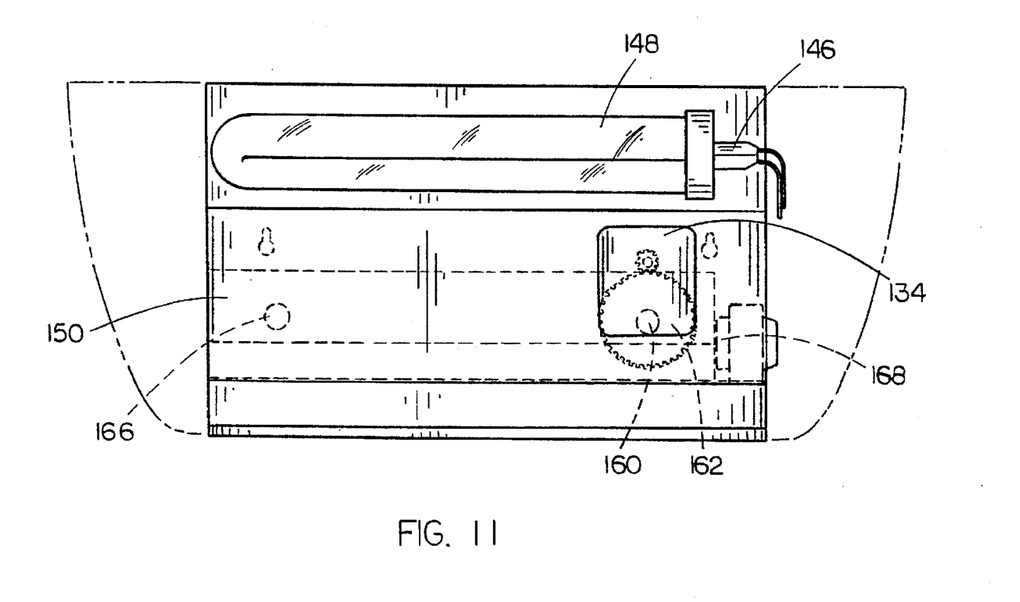
FIG. 11 is a diagrammatic front view of the trap showing the relative position of the cartridge and drive gears in the fully installed position of the cartridge.

Power for the various electrical elements may be supplied by an elongated cord 67 adapted to hang from the trap to reach a wall outlet as illustrated in FIGS. 1 and 8. Alternatively, the trap could be hard wired at its installed position so as to conceal the source of electric power.

The electrical elements support panel 18 may be formed as an aluminum extrusion or of relatively rigid molded plastic, for example. The cover shell 12 generally is preferably molded of a more flexible plastic with ultraviolet inhibitors so that it will not discolor or get brittle.

The trapping material for catching flies and insects is provided by cartridge 16 which is constructed as an open topped container having opposite sidewalls 68 and 69, opposite end walls 70 and 71 and a bottom wall 72. A raised socket or channel 74 is formed in the underside of bottom wall 72 as a stiffening element and to facilitate gripping the cartridge 16 during installation, removal and handling. An elongated strip 76 of trapping material has one end secured to a take-up roller 78 which is rotatably supported on and extended between side walls 68 and 69, such as by the saddle brackets 80 shown in FIG. 5. A large driven gear 82 is fixed on take-up roller 78 at a position just inside of side wall 69. The elongated strip 76 of trapping material is wound into a dispensing roll 84 which may be wound onto a dispensing roller 85 supported in saddle brackets 80 or simply placed behind a dividing wall or other barrier for maintaining the dispensing roll 84 in spaced relation from the take-up roller 78 so as to afford a length of exposed trapping material 86.

Figure 5:
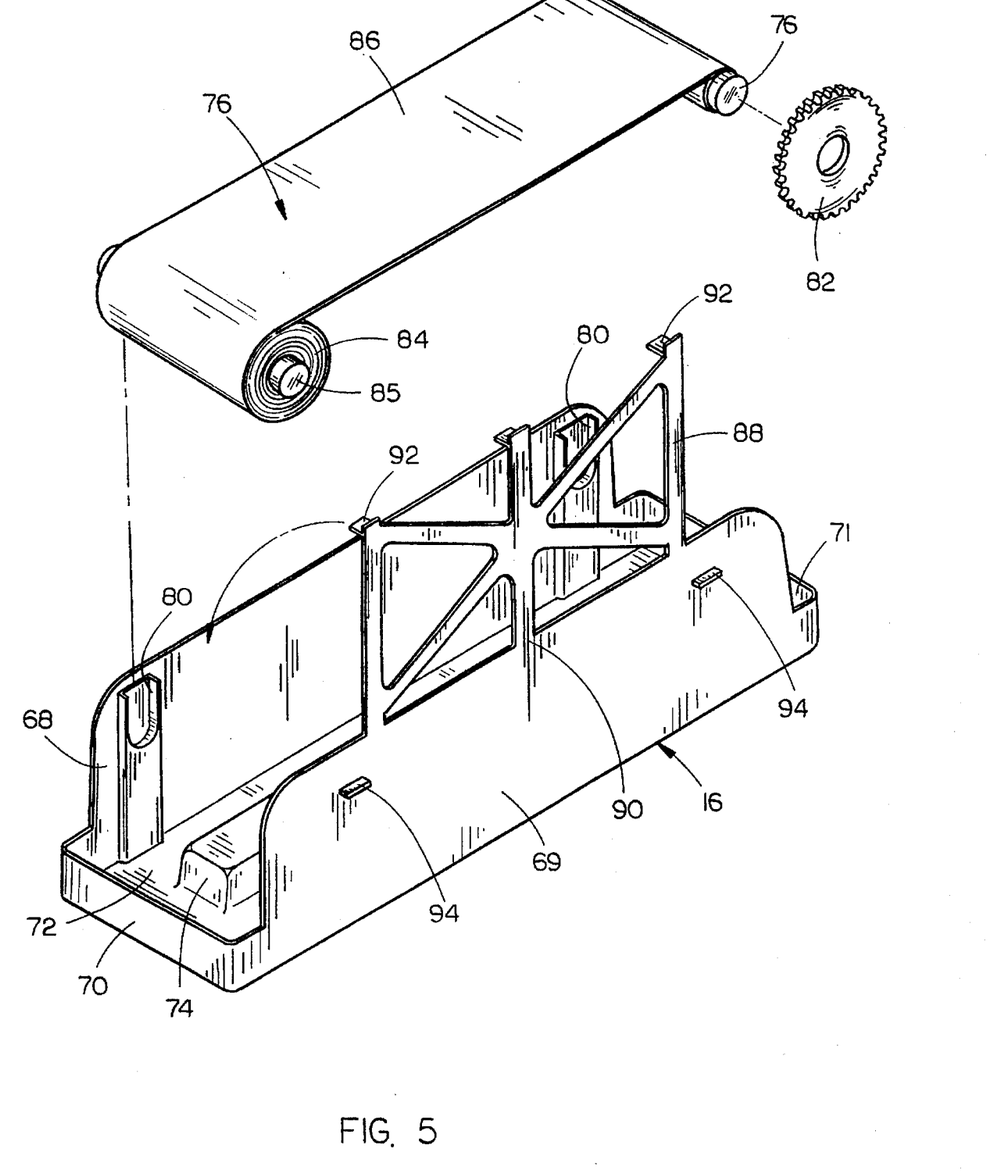
FIG. 5 is an exploded perspective view of the cartridge of the second embodiment of the trap.

In the illustrated embodiment, the cartridge 16 may be formed as a unitary molded plastic piece with a perforated top brace 88 connected by a live hinge 90 to side wall 69 and including depending tabs 92 on the opposite edge for a snap-fit connection to the opposite side wall 68. The perforated top brace 88 is situated in spaced relation above the exposed trap material 86 so as not to contact flies or insects trapped thereon.

To mount cartridge 16 on the base, the cartridge 16 has a pair of laterally protruding tabs 94 on both sidewalls 68 and 69. Referring to FIGS. 6 and 7, these cartridge tabs 94 are slidably received within arcuate channels 96 on rear wall 30 and support wall 20 for a bayonet slide lock connection of the cartridge to the shell 12. The cartridge is first raised into position up through bottom opening 14 to guide the tabs 94 between arcuate guide blocks 98 and the associated sloped tabs 100 which raises the cartridge tabs 94 into frictional engagement against a horizontal top flange 102. The cartridge is then advanced horizontally to the right as seen in FIGS. 6 and 7 to the point of engagement of the cartridge against the right hand edge of bottom opening 14 which provides a positive stop establishing the fully installed position for the cartridge When installed, the bottom of the cartridge fills and closes the bottom opening of cover shell 12. A pleasing effect may be achieved by coloring the cartridge a different color than the cover shell, perhaps to resemble the wrought iron base of a wall sconce light fixture.

Engagement of the cartridge driven gear 82 with the electric motor drive gear 62 is automatically achieved in response to installation of the cartridge 16. The generally horizontal sliding movement of cartridge tabs 94 on shell tabs 100 causes driven gear 82 to be moved tangentially toward and into engagement with drive gear 62, the position of which is fixed by the mounting of motor 58 on cartridge support wall 20. The engagement of the gear teeth of a toothed driven gear 82 with the teeth of a toothed drive gear 62 may cause a slight rotation of driven gear 82 for effective meshing of the gear teeth but such rotation is readily accommodated by the rotatable support of take-up roller 78. The term "gear" is not intended to be limited to toothed gears as illustrated but additionally contemplates fictionally engaged drive wheels or the like. In any event, the operator effectively engages the drive means with no conscious effort to do so simply by lifting and shifting the cartridge 16 into its fully installed position in engagement against the right hand end of shell bottom opening 14.

An alternate embodiment of trap 110 is illustrated in FIGS. 8–11. In this embodiment, the cover shell 112 is removably fit onto base 114 which is constructed from a series of rigid aluminum extrusions, as shown best in FIGS. 9 and 10. A rear wall 116 has a pair of keyhole slots 118 adjacent the top edge thereof for supporting the trap on a pair of wall screws or like fasteners. Below slots 118, an elongated horizontal cartridge positioning flange 120 is spaced relative to an elongated horizontal floor support socket 122 to define a cartridge receiving channel between them. An elongated floor support channel 124 protrudes outwardly and upwardly from a lower portion of rear wall 116 to engage and support a generally L-section channel defining bottom wall 126 and upright outer wall 128. Floor support channel 124 cooperates with arcuate bottom flange 130 to define a forwardly opening slot 132 for receiving the bottom edge of cover shell 112 in friction fit relation therein.

A motor 134 is mounted on the exterior surface of outer wall 128 with the output shaft 136 thereof extended through wall opening 138 for fixing the position of drive gear 140 within the cartridge receiving channel 142. A transformer and any other optional electrical elements may similarly be mounted on the exterior surface of outer wall 128 where they will be shielded from view by the cover shell 112.

A generally arcuate wall 143 is fixed to the top edge of outer wall 128 and extends upwardly and outwardly therefrom. A central slide track 144 is provided for mounting appropriate bracketry for securing fluorescent lamp receptacle 146 thereon so that U-shaped fluorescent light tube 148 may be plugged into it. Slide track 144 may likewise secure a bulb support bracket 149 (FIG. 8) for supporting the free end of fluorescent light tube 148 in equispaced relation above arcuate wall 143.

Trap 110 includes a disposable cartridge 150, preferably made from corrugated cardboard formed into an open topped container having a bottom wall 152, opposite sidewalls 154 and 155 and opposite end walls 156 and 157. An elongated strip of trapping material 158 similarly has one end secured to a take-up roller 160 with a driven gear 162 fixed thereon. The opposite end of the trapping material is wound into dispensing roll 164 which is maintained in spaced relation from take-up roller 160 by a dispensing roller 166 as shown if FIG. 11. In this embodiment, the cartridge 150 slides along bottom wall 126 into engagement with the ballast 168 for fluorescent light tube receptacle 146 which ballast serves as a stop for defining the fully installed position of the cartridge 150. Other stop means can be used. The driven gear 162 is thus caused to be advanced tangentially of drive gear 140 and into meshed or driven engagement therewith upon the cartridge being moved to its fully installed position.

The elongated strip of trapping material in both embodiments preferably has a sticky or tacky substance covering the entire outer surface but for a noncoated leader portion at the beginning of the roll so that prior to use in a trap, sticky substance is not exposed on the stored cartridges. A parting medium may be applied to the opposite surface of the trapping material to facilitate withdrawal of trapping material from the dispensing roll. The sticky or tacky substance may be of a type commonly used on fly paper. In addition, the outer surface of the trapping material may be additionally coated with an attractant substance, foodstuffs scents, carbon dioxide, synthesized pheromone or a trademarked odoriferous outdoor attractant such as Gotcha.

In a preferred embodiment, the length of the strip of trapping material is approximately eleven to thirteen feet. The length of the exposed portion of the trapping material may be approximately eight to ten inches and the motor is preferably operated to advance the trapping material in a manner to replace the exposed portion approximately every four days. A typical electric motor for such purpose may be an electric clock mechanism, commercially referred to as a high torque motor. Such a motor having a 720/1 output rotation will typically cause a single cartridge to last between 45 and 60 days depending upon the concentration of insects collected thereon and a motor having a 580/1 output rotation may be expected to cause a single cartridge to last between approximately 30 and 45 days with a moderate load of insects on the trapping material. The motor of the invention may be operated to advance the trapping material continuously at a very slow rate or periodically at a faster rate but for a duration not exceeding the time required to replace the exposed length of trapping material.

In both traps 10 and 110, either the cover shell or base or both have a shaped portion of the interior surface which is positioned relative to the light source for concentrating light from the light source onto the wall on which the trap is mounted, that light being concentrated at a position adjacent and above the apparatus for most effectively attracting flies and insects to the trap. In trap 10, that shaped portion is formed jointly by the upper interior surface of cover shell 12 which is aligned with arcuate wall 22 of the electrical elements support panel 18. In trap 110 of FIGS. 8–11, that shaped portion is provided by arcuate wall 143. Whereas that shaped portion in cross section, may be parabolic, a true parabolic curve is not critical to the invention since other shapes such as those illustrated effectively concentrate light onto the wall above the trap.

This concentration of light onto a relatively small area of the wall immediately above the trap is significant both in terms of performance and energy efficiency. By concentrating the light over a large area of the wall surface, the light at the area of concentration is brighter and therefore more effective for attracting insects. Energy efficiency results from the ability to use a lower wattage light source for effecting the same or greater brightness or intensity of light on the wall surface. Whereas prior art fly traps typically use light sources of fifty watts and above, a single forty watt U-shaped ultra violet fluorescent bulb is sufficient for the trap of the present invention.

The intensity of light on the wall immediately above the trap is further enhanced by the positioning of the light source. Specifically, the light source and shaped portion of the interior surface are positioned adjacent the upper edge of the cover shell with the light source positioned closer to the cover shell than to the wall surface on which the trap is mounted. The light source is therefore spaced substantially outwardly from the wall surface so that much of the directly radiated light from the source is directed to the wall immediately above the trap. In contrast, a light source mounted closely adjacent the wall surface would radiate most light within the trap itself and upwardly generally parallel to the wall surface without being radiated onto the wall surface. The combination of direct radiated light and reflected light from the shaped portion of the interior surface maximizes the intensity of light striking the wall surface immediately above the trap. A highly reflective material or sheet such as foil may be applied onto the shaped portion of the interior surface for improved reflection of light onto the wall surface.

Whereas the previous discussion refers to radiated and reflected "light" the light source of the invention is not limited to one which produces radiation within the visible spectrum. For example, a black light might be used. Because certain radiation outside the visible spectrum is also effective for attracting flying insects, the terms "light" and "light source" are intended to encompass radiation and sources of radiation outside the visible spectrum.

Another important advantage afforded by the trap of the present invention is greatly improved sanitation. To a limited degree, this is achieved by the lack of any chemical spray into the air and by operation which does not depend upon electrocution of the insects like commercial "zappers" which tend to disperse body parts into the air. The improved sanitation of the present invention is primarily achieved however by the construction and orientation of the cartridge. The substantially horizontal orientation of the exposed length of trapping material facilitates retention of flies and insects thereon. Insect body parts or other loose debris which collect on the exposed trapping material are urged by gravity toward the adhesive surface, but even if such debris is kept away from the adhesive surface by insect bodies collected thereon, such debris is simply collected within the container of the cartridge as the trapping material is advanced across the cartridge onto the take-up roller. Contrast this with the vertical trapping material of prior art traps. Body parts and debris can fall from the vertical trapping material into the trap or, worse yet, onto furnishings or patrons situated near the trap. These problems are solved by the open topped cartridge of the present invention.

Likewise, handling and replacing the typical glue boards or rolled up trapping material of prior art traps exposes the operator to contact with the spent trapping material and the insects collected thereon. One tending the fly trap of the present invention need not touch anything but the clean exterior surface of the cartridge housing when removing and replacing the cartridge. Even this is done infrequently because of the automatic advancing of trapping material onto the take-up roller without operator assistance.

Whereas the invention has been shown and described in connection with two preferred embodiments thereof, it is understood that many modifications, additions and substitutions may be made which are within the intended broad scope of the appended claims.

I claim:

1. An apparatus for trapping flies and other insects, comprising, a base means for mounting said base on a wall surface, a replaceable cartridge including an elongated strip of trapping material, means for removably receiving and supporting said cartridge on said base in a fully installed position thereon, a light source, means for supporting said light source on said base at a position relative to said base so as to be spaced substantially outwardly from a wall surface on which said base is mounted, whereby said light source radiates light directly onto said wall surface adjacent and above said base for attracting insects, an open topped cover shell having a top edge and being of a size and shape to substantially conceal said base, strip of trapping material, and light source on three sides, means for mounting said cover shell on said base at a position to substantially conceal said base, strip of trapping material and light source from view from below the top edge of said cover shell, said replaceable cartridge including an open topped container including opposite sidewalls, a take-up roller extended between said sidewalls, said strip of trapping material being arranged in a dispensing roll spaced from said take-up roller and having one end secured to said take-up roller and an exposed portion of said strip of trapping material extended between said dispensing roll and take-up roller, said exposed portion having an upwardly facing top surface and an opposite surface, said top surface adapted to entrap insects which contact it, and a driven gear on said take-up roller, a drive gear supported on said base and positioned for driving engagement with said driven gear in the fully installed position of said cartridge, said driven gear arranged on said cartridge at a position to be moved into driven engagement with said drive gear upon movement of said cartridge to the fully installed position thereof.

2. The apparatus of claim 1 wherein the open topped container of said cartridge includes a bottom wall which cooperates with said side walls to define a receptacle for collecting insects or parts of insects which may fall from said trapping material.

3. The apparatus of claim 2 wherein the exposed portion of said trapping material is generally horizontally disposed for broad exposure to insects drawn to light radiated onto said wall surface.

4. The apparatus of claim 3 wherein said means for removably receiving and supporting said cartridge comprises a support surface operative to support said cartridge for sliding movement thereon and stop means for limiting sliding movement of said cartridge on said support surface to the fully installed position thereof.

5. The apparatus of claim 4 wherein said support surface constrains said driven gear to movement in a direction generally tangentially of said drive gear into driven engagement with said drive gear.

6. The apparatus of claim 5 wherein said strip of trapping material has a sticky substance applied to the top surface thereof and a parting medium on the opposite surface thereof.

7. The apparatus of claim 6 wherein said cover shell includes an opening through which said cartridge is inserted, said cartridge substantially closing said opening in the fully installed position thereof.

8. The apparatus of claim 7 wherein said bottom wall of said cartridge has a downwardly opening depression formed therein to facilitate gripping and handling of said cartridge without contacting said trapping material.

9. The apparatus of claim 6 wherein said cover shell is removably mounted on said base for removal to allow access to said cartridge for installation and replacement.

10. The apparatus of claim 9 wherein said base includes an outwardly facing slot and said cover shell has a generally horizontal lower edge adapted to be removably slide fit into said outwardly facing slot for supporting said cover shell on said base.

11. The apparatus of claim 1 wherein at least one of said cover shell and base have an interior surface and a shaped portion of the interior surface positioned relative to said light source for concentrating light from said source onto a wall surface at a position adjacent and above said apparatus.

12. The apparatus of claim 11 wherein said cover shell has an upper edge and said light source and shaped portion of the interior surface are positioned adjacent the upper edge of said cover shell with said light source positioned closer to said cover shell than to a wall surface on which said apparatus is mounted.

13. The apparatus of claim 12 wherein said shaped portion of said interior surface has a generally parabolic shape.

14. The apparatus of claim 12 wherein said shaped portion of said interior surface is on said base at a position in spaced relation from said cover shell.

15. The apparatus of claim 12 wherein said cover shell and at least a portion of said base are integrally formed as a unitary member.

16. The apparatus of claim 1 wherein said light source is mounted above and outwardly of said cartridge in the fully installed position of said cartridge.

17. The apparatus of claim 1 further comprising a motor operatively connected to said drive gear for rotating said drive gear.

18. The apparatus of claim 1 wherein said base includes a mounting surface positioned for engagement against a wall surface on which said apparatus is mounted, said means for mounting said base on a wall surface comprising a pair of headed fasteners adapted to protrude from a wall surface and a pair of generally P-shaped slots in said mounting surface arranged perpendicular to one another for receiving said headed fasteners and positively positioning said apparatus thereon.

19. An apparatus for trapping flies and other insects, comprising, a base, means for mounting said base on a wall surface, a replaceable cartridge including an elongated strip of trapping material, an open topped container including opposite side walls, and a take-up roller extended between said side walls, means for removably receiving and supporting said cartridge on said base in a fully installed position thereon, a light source, means for supporting said light source on said base at a position relative to said base so as to be spaced substantially outwardly from a wall surface on which said base is mounted, an open topped cover shell having a top edge and being of a size and shape to substantially conceal said base, strip of trapping material and light source on three sides, means for mounting said cover shell on said base at a position to substantially conceal said base, strip of trapping material and light source from view from below the top edge of said cover shell, at least one of said cover shell and base having an interior surface and a shaped portion of the interior surface positioned relative to said light source for concentrating light from said source onto a wall surface at a position adjacent and above said apparatus, said strip of trapping material being arranged in a dispensing roll spaced from said take-up roller and having one end secured to said take-up roller and an exposed portion of said strip of trapping material extended between said dispensing roll and take-up roller, said exposed portion having an upwardly facing top surface adapted to entrap insects which contact it, and a driven gear on said take-up roller, said apparatus further comprising of a drive gear supported on said base and positioned for driving engagement with said driven gear in fully installed position of said cartridge at a position to be moved into driven engagement with said drive gear for the movement of said cartridge to the fully installed position thereof.

20. The apparatus of claim 19 wherein said open topped container of said cartridge includes a bottom wall which cooperates with said side walls to define a receptacle for collecting insects or parts of insects which may fall from said trapping material.

21. The apparatus of claim 20 wherein said base includes a mounting surface positioned for engagement against a wall surface on which that apparatus is mounted, said means for mounting said base on a wall surface comprising a pair of spaced slots in said mounting surface arranged perpendicular to one another and adapted to receive a pair of correspondingly spaced headed fasteners that are fixed in said wall surface resulting in positively positioning said apparatus on said wall surface.

22. An apparatus for trapping flies and other insects, comprising, a base, means for mounting said base on a wall surface, a replaceable cartridge including an elongated strip of trapping material, means for removably receiving and supporting said cartridge on said base in a fully installed position thereon, a light source, means for supporting said light source on said base at a position relative to said base so as to be spaced substantially outwardly from a wall surface on which said base is mounted, an open topped cover shell having a top edge and being of a size and shape to substantially conceal said base, strip of trapping material and light source on three sides, means for mounting said cover shell on said base at a position to substantially conceal said base, strip of trapping material and light source from view from below the top edge of said cover shell, at least one of said cover shell and base having an interior surface and a shaped portion of the interior surface positioned relative to said light source for concentrating light from said source onto a wall surface at a position adjacent and above said apparatus, said light source and said shaped portion of said interior surface being positioned adjacent the top edge of said cover shell with said light source positioned closer to said cover shell than to a wall surface on which said apparatus is mounted, said shaped portion of said interior surface extending generally horizontally side to side across said base at a position below and outwardly of said light source, said shaped portion of said interior surface having a generally parabolic shape and being on said base at a position in spaced relation from said cover shell.

* * * * *